April 8, 1941.  R. L. ANDERSON  2,237,517
HARVESTER PLATFORM
Filed Jan. 2, 1940
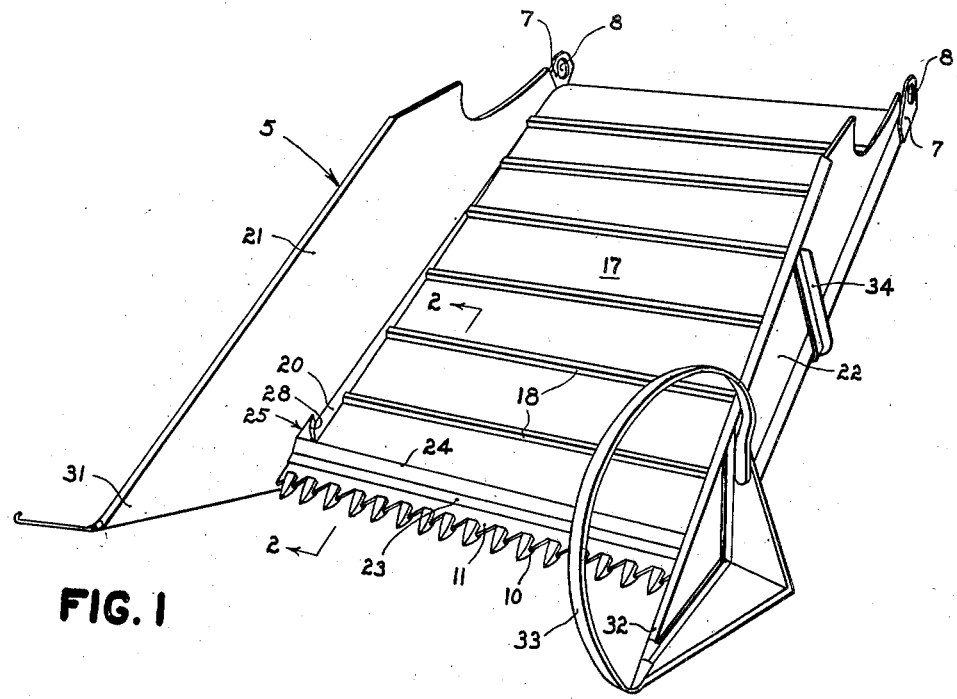
FIG. 1
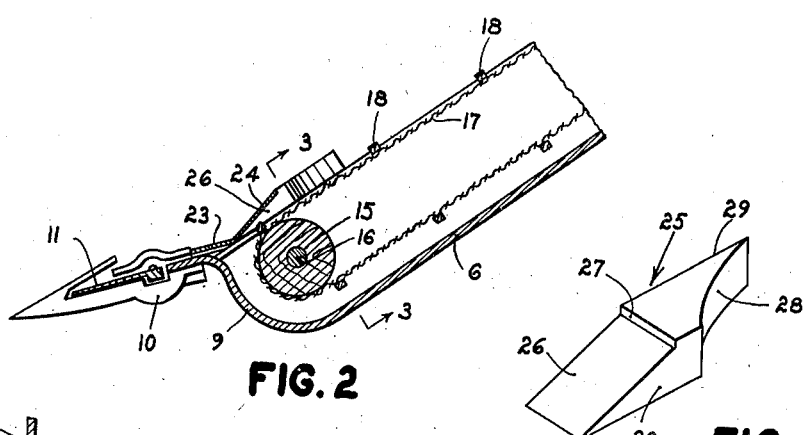
FIG. 2
FIG. 4
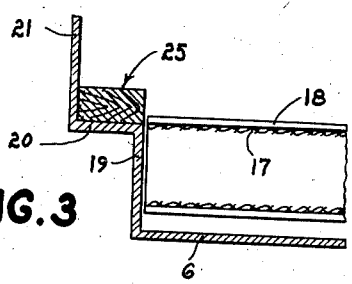
FIG. 3
INVENTOR:
Ralph L. Anderson
BY
ATTORNEYS.

Patented Apr. 8, 1941

2,237,517

UNITED STATES PATENT OFFICE 2,237,517

HARVESTER PLATFORM

Ralph L. Anderson, Moline, Ill., assignor to Deere & Company, Moline, Ill., a corporation of Illinois Application January 2, 1940, Serial No. 312,043

6 Claims. (Cl. 56—153)

The present invention relates generally to harvester platforms and more particularly is concerned with platforms of the type which are pivotally connected to a harvesting implement for vertical swinging movement about a transversely extending axis and extend forwardly from the implement in downwardly inclined relation thereto, such as are commonly used on the "straight-through" type of combined harvester-thresher machines. In this type of machine the cutter bar is disposed transversely along the lower edge of the platform and an endless canvas conveyor is provided for carrying the harvested crop from the cutter bar directly upwardly and rearwardly to the cylinder at the upper end of the platform. It has been common practice to make the cutter bar somewhat longer than the cylinder and provide a pair of side walls or side sheets on the platform, which extend from opposite ends of the cutter bar upwardly and rearwardly on the platform in converging relation to the width of the cylinder at the upper end of the platform. Inasmuch as the canvas conveyor must necessarily be of a uniform width, it has been the custom to make the conveyor substantially equal in width to the cylinder, with the result that there is an upwardly tapering space at each side of the platform between the side walls and the canvas conveyor. It has been found that in general there has been very little difficulty encountered in moving the harvested crop up the platform by the action of the reel and the canvas conveyor, but under certain conditions, such as when the grain is extremely dry or very ripe, there is some tendency for the grain to separate from the stalks, and in such cases, any kernels that fall on the platform between the side sheets and the canvas have a tendency to slide or roll down the platform, resulting in a certain amount of loss of grain, which slides downwardly over the cutter bar onto the ground. This is particularly noticeable in the case of soy beans when the latter are extremely dry and tend to shell easily, due to the fact that the beans are spherical in shape and so have a greater tendency to roll down the inclined platform over the cutter bar.

It is therefore the object of the present invention to provide means for preventing or minimizing this loss of grain, and in the accomplishment of this object I have provided a deflector at the lower end of the platform between the canvas and the side wall for the purpose of guiding to the canvas conveyor any grain which rolls or slides down the space between the conveyor and the wall before it reaches the cutter bar.

This and other objects and advantages of my invention will become apparent after a consideration of the following description, in which reference is had to the drawing appended hereto, in which Figure 1 is a perspective view of a harvester platform, in which is incorporated a device embodying the principles of this invention;

Figure 2 is a sectional elevational view taken along a line 2—2 in Figure 1;

Figure 3 is a sectional view taken along a line 3—3 in Figure 2; and

Figure 4 is a perspective view of one of the deflectors embodying the principles of my invention.

Referring now to the drawing, the harvester platform, indicated generally by reference numeral 5, comprises a grain pan 6 mounted on a pair of laterally spaced frame members 7, at the upper end of which are provided bearing members 8, which are adapted for pivotally supporting the platform for vertical swinging movement about a transverse axis.

The platform 5 is normally inclined downwardly and forwardly from the transversely aligned pivot bearing members 8, and the lower end of the grain pan 6 is curved upwardly and forwardly at 9. A cutter bar 10 is mounted on the lower end of the grain pan by any suitable attaching means in a transversely extending position and is adapted to sever the standing grain by means of a sickle 11, which cooperates with the cutter bar 10 in a manner known to those skilled in the art. The sickle 11 is reciprocated by driving means which are also well known and therefore need not be shown or described here.

Directly behind the cutter bar 10 and within the lower curved portion 9 of the grain pan 6 is disposed a transversely extending roller 15 mounted on an axle 16, which is suitably journaled at opposite ends thereof, by means not shown, supported in the grain pan 6. An endless canvas conveyor 17 is trained around the lower roller 15 and extends rearwardly and upwardly in the grain pan 6 to an upper roller (not shown) rotatably mounted at the upper end of the platform in a conventional manner. The canvas is provided with the usual transversely extending longitudinally spaced slats 18 which are fixed to the canvas by any suitable means, such as rivets, and are adapted to engage the crop, as the latter is severed from the field by the sickle and falls upon the canvas 17 or is laid thereon by the usual grain reel (not shown). The grain travels upwardly on the upper run of the conveyor 17 and is delivered at the upper end of the conveyor to the combine cylinder.

The canvas conveyor 17 is of uniform width from top to bottom, which is substantially equal to the width of the cylinder, but the cutter bar 10 is slightly wider than the canvas and thus extends beyond the canvas at each side thereof an amount in the order of five or six inches. The sides 19 of the grain pan (see Figure 3) extend upwardly on each side of the canvas conveyor 17 up to approximately the level of the upper run of the canvas and from there are flared outwardly to provide a shelf 20, which extends between the outside edges of the canvas and the outer ends of the cutter bar 10. A pair of sheet metal side walls 21, 22 extend vertically from each end of the cutter bar 10 and extend up the platform in rearwardly converging relation so that at the upper end of the platform the side walls 21, 22 are in juxtaposition with the edges of the canvas conveyor. Thus the shelves 20 are substantially triangular in shape and, as explained heretofore, permit soy beans and kernels of grain to slide or roll downwardly, some of which heretofore have been lost over the cutter bar. Some of this loss has been prevented by the canvas shield 23 which comprises an angular metallic member, which is coextensive with the cutter bar 10 and has an upwardly bent rear edge 24 which extends over the lower end of the canvas conveyor and is adapted to barely clear the slats 18 as they pass upwardly around the roller 15.

The deflector, indicated generally by reference numeral 25, with which the present invention is particularly concerned, comprises in the preferred embodiment, a wooden block disposed at the lower end of the shelf 20 and having a forward wedge-shaped attaching portion 26, which is shaped to fit under the upwardly bent portion 24 of the canvas guide 23. The top of the block 25 is offset upwardly at 27, so that the upper surface of the block is flush with the upper surface of the rear edge portion 24 of the shield 23. The deflector is provided with a rear deflecting surface 28, which curves forwardly and inwardly from the outer edge 29 of the deflector, which fits adjacent the side wall 21, to the inner edge 30 of the deflector, which is in juxtaposition with the edge of the canvas 17, as indicated in Figure 3.

Each of the side walls 21, 22 extends forwardly ahead of the cutter bar to provide a pair of gathering points 31, 32 for gathering the standing grain and guiding it to the cutter bar 10. A curved grain divider 33 is connected to the forward end of the grainward gathering point 32 and curves upwardly and rearwardly and is connected at its rearward end with the side sheet 22. A transverse bracing member extends under the grain pan and has a pair of upwardly turned ends 34 extending upwardly along the outer sides of the side walls for supporting the latter.

During operation the platform advances through the standing grain, severing the latter, which falls or is urged rearwardly over the canvas shield 23 and is carried upwardly by the canvas 17. That portion of the grain which falls at either end of the cutter bar is swept upwardly over the deflectors 25 and is carried upwardly by the canvas and is compressed by the converging side walls 21, 22 to the width of the cylinder. Any beans or kernels that are separated from the straw and fall on the shelf 20 between the canvas 17 and the side wall, and which roll or slide downwardly on the shelf, are guided inwardly when they strike the inclined deflecting surface 28 of the deflector 25 and thus are caught by the slats 18 on the canvas conveyor 17 and are carried upwardly and passed through the cylinder into the separator of the combine and are thus saved from being lost over the cutter bar onto the ground.

I do not intend my invention to be limited to the particular shape and position of the deflecting means shown and described herein nor to the other details of construction as disclosed, except as may be limited by the claims which follow.

I claim:

1. In a harvester, an inclined platform, a conveyor movable upwardly thereon for conveying harvested material, a side wall on said platform alongside said conveyor and spaced laterally therefrom, the surface of said platform between said conveyor and said side wall being in a plane substantially parallel with said conveyor, and a deflector attached to said platform and disposed between said conveyor and said wall and comprising an abutment rising above said platform surface for guiding to said conveyor any of said material that slides down said platform surface.

2. In an inclined harvester platform, crop gathering means disposed at the lower end thereof, a conveyor movable upwardly on said platform for conveying harvested material from said gathering means, a wall mounted on said platform alongside of said conveyor but spaced laterally therefrom, the surface of said platform between said conveyor and said side wall being in a plane substantially parallel with said conveyor, and a deflector mounted on said platform above said gathering means between said wall and said conveyor and having a forwardly and inwardly inclined deflecting edge rising above said platform surface for guiding toward said conveyor any of said material that slides down said platform surface.

3. In a harvesting device, a forwardly extending, downwardly inclined platform, a transverse cutter bar mounted at the lower end thereof, an endless canvas conveyor movable upwardly on said platform to convey harvested material rearwardly from said cutter bar, a side wall mounted on said platform along said canvas conveyor but spaced laterally therefrom, the surface of said platform between said conveyor and said side wall being in a plane substantially parallel with said conveyor, and a deflector mounted on said platform above said cutter bar and having a forwardly and inwardly inclined deflecting surface rising generally perpendicular to said platform surface for guiding onto said canvas any of said material that slides down said platform between said wall and said canvas.

4. In a harvesting device, a forwardly extending downwardly inclined platform, a transverse cutter bar mounted at the lower end thereof, an endless canvas conveyor having a width less than that of the cutter bar and movable upwardly on said platform to convey harvested material rearwardly from said cutter bar, a pair of side walls at opposite ends of said cutter bar, respectively, and extending up said platform therefrom in converging relation to a point at which said walls are in juxtaposition with said canvas conveyor the surface of said platform between said conveyor and said side walls being in a plane substantially parallel with said conveyor and a forwardly and inwardly inclined deflector disposed behind said cutter bar projecting upwardly from said platform surface between at least one of said side walls and said canvas conveyor for guiding onto the latter any of the harvested material that slides down said platform surface.

5. In a harvesting device, a forwardly extending, downwardly inclined platform, a transverse cutter bar mounted at the lower end thereof, an endless canvas conveyor movable upwardly on said platform to convey harvested material rearwardly from said cutter bar, a shield disposed behind said cutter bar and extending over the lower end of said canvas conveyor, a side wall mounted on said platform along said conveyor but spaced laterally therefrom, the surface of the platform between said conveyor and said side wall being in a plane generally parallel with said conveyor, and a deflector mounted on said platform behind said cutter bar between said side wall and said conveyor, said deflector having an attaching portion adapted to extend downwardly under said shield, and a deflecting edge rising from said pltaform surface inclined forwardly and inwardly from said side wall toward said canvas conveyor.

6. In a harvesting device, a forwardly extending, downwardly, inclined platform comprising a grain pan, a transverse cutter bar mounted at the lower end thereof, an endless conveyor having a width less than that of the cutter bar and mounted in said pan for movement upwardly from said cutter bar, a side wall disposed along said conveyor extending upwardly from the end of said cutter bar and spaced laterally from the side of said conveyor, a shelf disposed between said side wall and said canvas and in a plane substantially parallel with the upper run of the latter, and a deflector mounted on said shelf above said cutter bar and having a forwardly and inwardly inclined deflecting surface for guiding onto said conveyor any harvested material that slides downwardly on said shelf.

RALPH L. ANDERSON.